(12) United States Patent
Ranganathan et al.

(10) Patent No.: US 12,412,365 B2
(45) Date of Patent: Sep. 9, 2025

(54) SYSTEM AND METHOD FOR DIGITAL OBJECT IDENTIFICATION AND TRACKING USING FEATURE EXTRACTION AND SEGMENTATION

(71) Applicant: VERIZON PATENT AND LICENSING INC., Basking Ridge, NJ (US)

(72) Inventors: Prakash Ranganathan, Tamilnadu (IN); Saurabh Tahiliani, Uttar Pradesh (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 394 days.

(21) Appl. No.: 17/819,206

(22) Filed: Aug. 11, 2022

(65) Prior Publication Data
US 2024/0054758 A1    Feb. 15, 2024

(51) Int. Cl.
G06V 10/74     (2022.01)
G06T 7/246     (2017.01)
G06T 7/277     (2017.01)
G06T 7/73      (2017.01)
G06V 10/75     (2022.01)

(52) U.S. Cl.
CPC ............ *G06V 10/761* (2022.01); *G06T 7/248* (2017.01); *G06T 7/277* (2017.01); *G06T 7/74* (2017.01); *G06V 10/751* (2022.01); *G06V 10/757* (2022.01); *G06T 2207/10016* (2013.01)

(58) Field of Classification Search
None
See application file for complete search history.

(56) References Cited

U.S. PATENT DOCUMENTS

| | | | |
|---|---|---|---|
| 2020/0250807 A1* | 8/2020 | Hong | G06T 7/11 |
| 2021/0166396 A1* | 6/2021 | Chen | G06T 3/02 |
| 2022/0189039 A1* | 6/2022 | Viguier | G01C 3/08 |
| 2022/0284691 A1* | 9/2022 | Chen | G06V 10/762 |

* cited by examiner

*Primary Examiner* — Leon Viet Q Nguyen

(57) ABSTRACT

Techniques for identifying and tracking objects in digital content are disclosed. In one embodiment, a method is disclosed comprising obtaining a frame of digital content, the frame comprising pixel data, detecting an object using the pixel data, determining a set of attributes for the detected object, the set of attributes comprising position, object segment and affine attributes, determining a similarity measurement for the detected object and a second object using the set of attributes corresponding to the detected object and the second object's set of attributes, and using the similarity measurement to make a similarity determination whether or not the detected object and the second object are a same object.

18 Claims, 9 Drawing Sheets

SYSTEM AND METHOD FOR DIGITAL OBJECT IDENTIFICATION AND TRACKING USING FEATURE EXTRACTION AND SEGMENTATION

BACKGROUND INFORMATION

Existing systems used to identify and track digital object across frames of digital content are inconsistent and prone to errors due to, for example, poor lighting and trajectory issues.

DETAILED DESCRIPTION

The disclosed embodiments provide novel systems and methods for increasing the accuracy and efficiency in identifying and tracking objects across, or through, frames of digital content. As discussed herein, according to some embodiments, the disclosed systems and methods use position, segment and affine object attributes to identify and track an object across frames.

Lighting (e.g., poor lighting) and object trajectory (e.g., overlapping, intersecting, occluding, etc.) issues can lead to inconsistent object identification and tracking in a set of video frames. The disclosed framework provides novel systems and method for addressing such issues and increasing the accuracy and efficiency in object identification and tracking.

In accordance with one or more embodiments of the present application, a similarity between a pair of detected objects in different frames of a video can be determined using position, segment and affine attributes determined for each detected object. By way of a non-limiting example, the determined similarity can be used to ascertain whether or not the pair of objects detected in different frames of digital content are the same object in order to track the object across the frames. While embodiments of the present disclosure are discussed in connection with tracking a single object across frames, it should be apparent that embodiments of the present disclosure can be used to track any number of objects across any number of frames.

Figure 1:
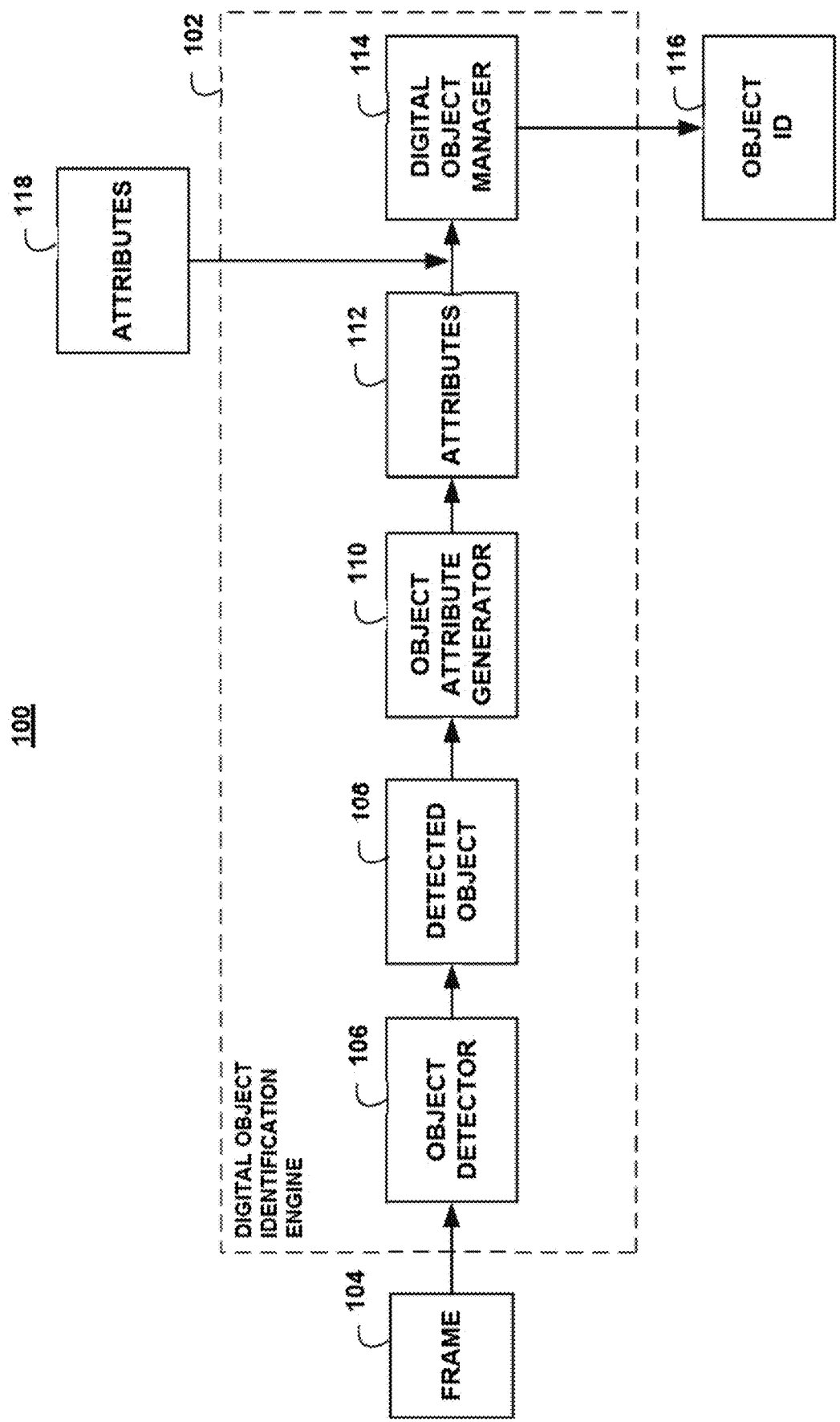
FIG. 1 provides an example illustrating a digital object identification engine in accordance with one or more embodiments of the present disclosure.

FIG. 1 provides an example illustrating a digital object identification engine in accordance with one or more embodiments of the present disclosure. In example 100 shown in FIG. 1, digital object identification engine 102 comprises an object detector 106, object attribute generator 110 and digital object manager 114. In accordance with one or more embodiments, engine 102 can be used to track an object across frames of a digital content item.

In accordance with one or more embodiments, frame 104 can comprise image data (e.g., pixel data) that can be used by object detector 106 to detect an object, e.g., detected object 108. By way of a non-limiting example, object detector 106 can use any computer vision, or image processing, technique now known or later developed to identify and locate objects within the image data of frame 104. By way of a further non-limiting example, object detector 106 can be a machine model trained to detect an object based on features generated using the image data from frame 104. By way of yet a further non-limiting example, object detector 106 can use a trained machine model (e., a support vector machine), a trained neural network, or some combination thereof to locate and identify each object in frame 104.

In accordance with one or more embodiments, object attribute generator 110 can determine attributes 112 of detected object 108 using pixel data from frame 104 and a bounding box and corresponding coordinates (e.g., "x" and "y" coordinates) generated by object detector 106. In accordance with one or more embodiments, attributes 112 comprise position, segment and affine attributes of the detected object 108. Digital object manager 114 can use attributes 112 and attributes 118 corresponding to a second detected object to determine an object identification (or object ID) 116 for detected object 108.

As discussed in more detail below, a pair of attributes (e.g., attributes 112 and attributes 118) corresponding to a pair of detected objects 108 can be used to determine a measure of similarity between the pair of detected objects 108. The determined measure of similarity can be used to determine whether or not the pair of detected objects 108 are the same object.

In accordance with one or more embodiments, digital object manager 114 can determine that detected object 108 is a new (e.g., or unidentified) object and assign a new object ID 116. Alternatively, attributes 118 can be associated with an existing object ID 116 assigned to a previously-identified object, and the existing object ID 116 can be assigned (e.g., by digital object manager 114) to detected object 108 if it determines that detected object 108 and the previously-identified object are sufficiently similar to be considered to be the same object.

In accordance with one or more embodiments, engine 102 can be used to track detected object 108 across multiple frames of digital content using attributes 112 determined for the detected object 108 in each of the multiple frames. Attributes 112 can be generated by object attribute generator 110 of engine 102.

Figure 2:
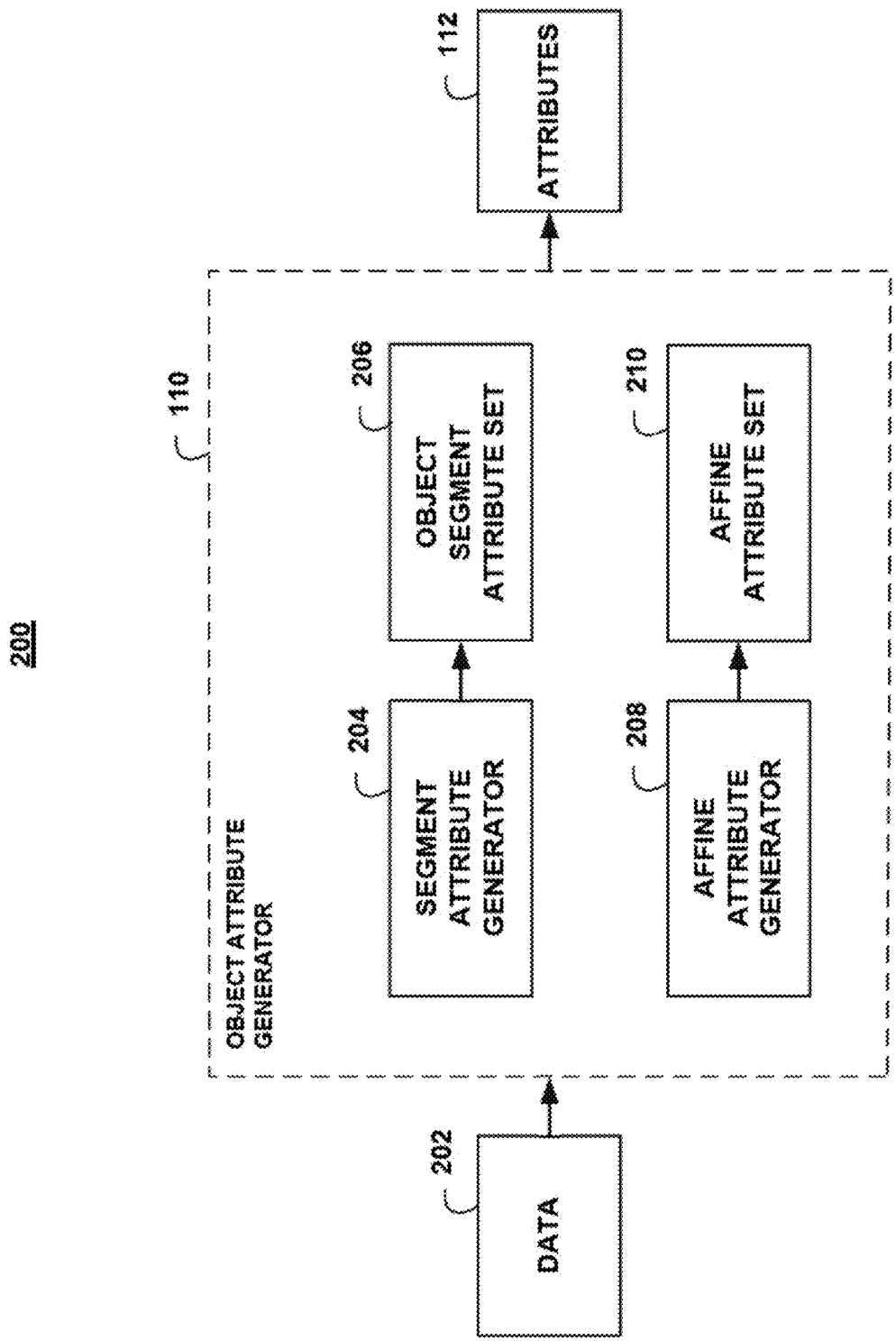
FIG. 2 provides an example illustrating components of an object attribute generator in accordance with one or more embodiments of the present disclosure.

FIG. 2 provides an example illustrating components of object attribute generator 110 in accordance with one or more embodiments of the present disclosure. In example 200 shown in FIG. 2, object attribute generator 110 comprises segment attribute generator 204 and affine attribute generator 208.

In accordance with one or more embodiments, data 202, input to object attribute generator 110, can include a bounding box and associated position (e.g., coordinates) for detected object 108 (e.g., determined by object detector 106) and pixel data from frame 104. Object attribute generator 110 can use data 202 to generate attributes 112 for detected object 108. As discussed, in accordance with one or more embodiments, attributes 112 can comprise position, segment and affine attributes. In example 200 of FIG. 2, the segment and affine attributes are shown as (respectively) object segment attribute set 206 and affine attribute set 210.

Segment attribute generator 204 can segment frame 104 to separate the detected object 108 from other portions (e.g., background portions) of frame 104. By way of a non-limiting example, frame 104 can include multiple segments of pixels, where one of the pixel segments (e.g., an object segment) corresponds to detected object 108. By way of a further non-limiting example, segment attribute generator 204 can generate object segment attribute set 206 corresponding to detected object 108. By way of a non-limiting example, object segment attribute set 206 includes aspects of detected object 108, such as its shape (or outline), boundary, size, edges, contours, area, etc. In accordance with one or more embodiments, object segment attribute set 206 can comprising pixel data in the object segment corresponding to detected object 108.

Figure 3:
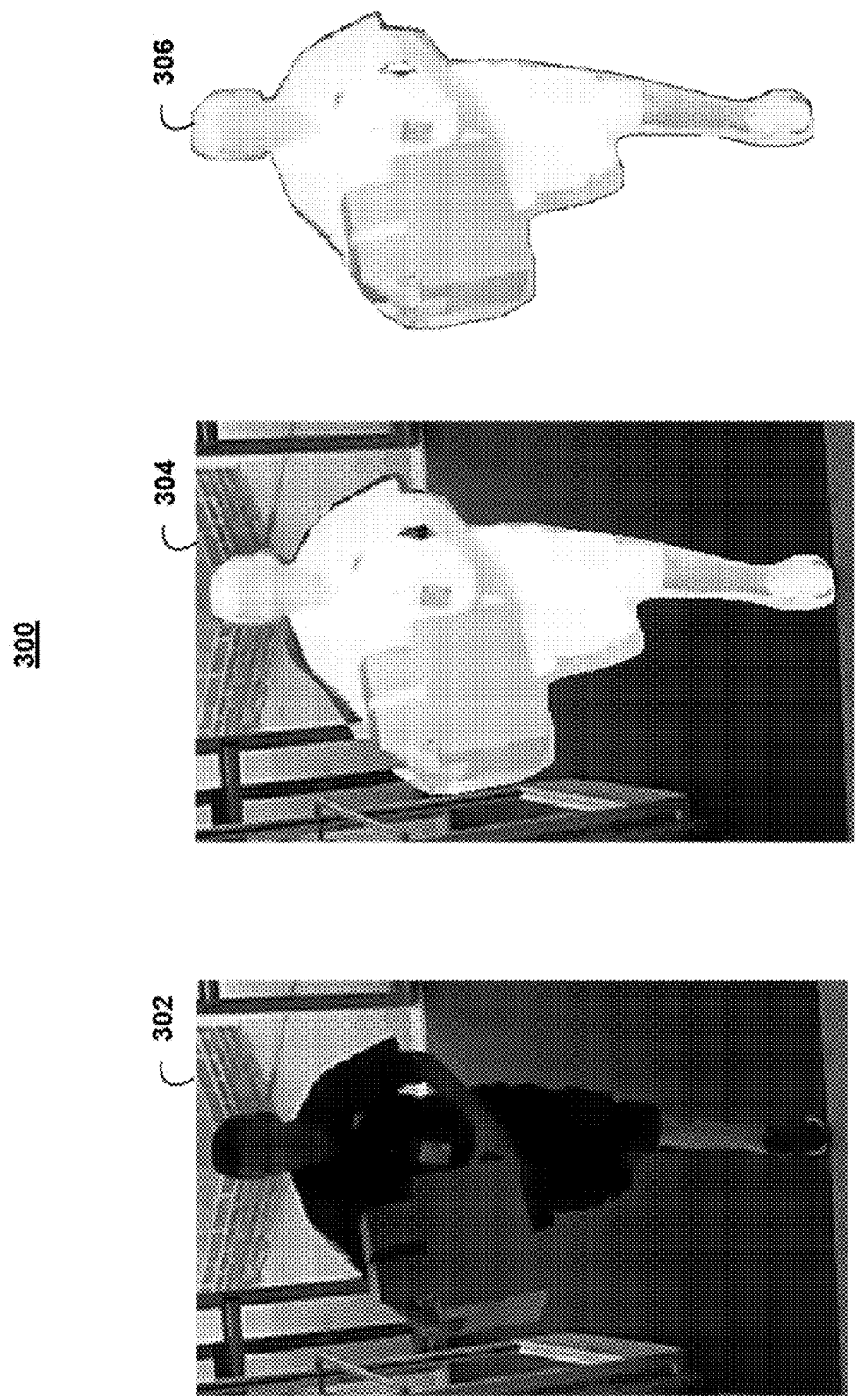
FIG. 3 provides an object segment example in accordance with one or more embodiments of the present disclosure.

FIG. 3 provides an object segment example in accordance with one or more embodiments of the present disclosure. For the sake of example 300, detected object 108 can be the individual entering through a doorway holding boxes in image 302. Image 302 also provides an example of an image captured in a low-light setting. Examples 304 and 306 provide pictorial illustrations of the detected object 108 segmented from other portions of image 302.

Referring again to FIG. 2, segment attribute generator 204 can use polygon segmentation to generate object segment attribute set 206 corresponding to detected object 108. In accordance with one or more embodiments, object segment attribute set 206 generated using polygon segmentation can comprise information about detected object 108, such as its shape (or outline), boundary, size, edges, contours, area, etc.

In accordance with one or more embodiments, affine attribute generator 208 can generate affine attribute set 210 for detected object 108. By way of a non-limiting example, affine attribute set 210 can be determined using data 202 alone or in combination with object segment attribute set 206. An affine attribute can be generated using one or more transformations that preserve collinearity and parallelism. An affine transformation can preserve collinearity such that three or more points (or colinear points) that lie on a same line prior to the transformation continue to be collinear after (or as a result of) the transformation. Similarly, an affine transformation can preserve parallelism such that two or more lines that are parallel prior to the transformation remain parallel after (or as a result of) the transformation. As discussed in more detail below, affine attribute set 210 comprises information identifying reference points of detected object 108.

In accordance with one or more embodiments, attributes 112 generated by object attribute generator 110 comprise the bounding box and bounding box coordinates, object segment attribute set 206 and affine attribute set 210.

In accordance with one or more embodiments, digital object manager 114 can use a pair of attributes 112 corresponding to a pair of detected objects 108 to determine whether the pair of detected objects 108 are the same object. By way of a non-limiting example, one of the detected objects 108 (in the pair) can be a previously-identified object, such as an object detected in a frame 104 previously analyzed by digital object identification engine 102. By way of a further non-limiting example, each detected object 108 identified by digital object identification engine 102 can have an assigned object ID 116. In accordance with embodiments of the present disclosure, the same object ID 116 can be assigned to a number of detected objects 108, where each detected object 108 (in the number) is determined to be sufficiently similar.

By way of a non-limiting example, digital object manager 114 can use a pair of attributes 112 (e.g., corresponding to a pair of detected object 108 objects) to measure the similarity between the pair of attributes (and the pair of detected objects 108). The similarity measurement can be used to determine whether or not the pair of objects are sufficiently similar such that the pair of objects 108 can be said to be the same object.

Figure 4:
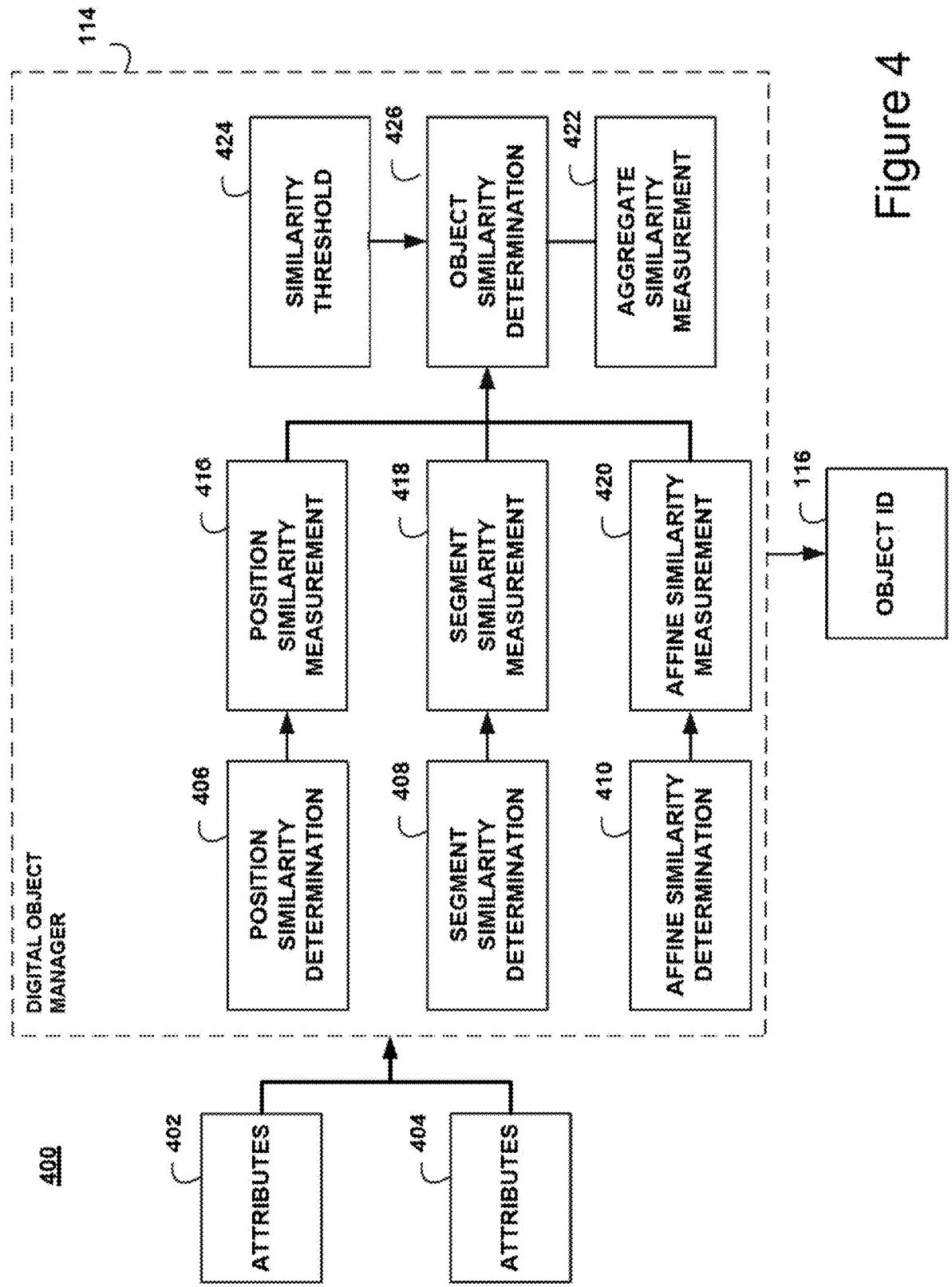
FIG. 4 provides an example illustrating components of a digital object manager in accordance with one or more embodiments of the present disclosure.

FIG. 4 provides an example illustrating components of digital object manager 114 in accordance with one or more embodiments of the present disclosure. In example 400 of FIG. 4, digital object manager 114 comprises a position similarity determination module 406, segment similarity determination module 408, affine similarity determination module 410 and object similarity determination module 426.

In accordance with one or more embodiments, digital object manager 114 receives attributes 402 and 404 as input. Attributes 402 and 404 each to attributes 112 determined for a detected object 108. By way of a non-limiting example, attributes 402 can correspond to a detected object 108 found in frame 104 currently being processed by digital object identification engine 102, and attributes 404 can corresponds to a detected object 108 found in frame 104 previously processed by digital object identification engine 102. By way of a further non-limiting example, the previously-processed object 108 can have a previously-assigned object ID 116. The current object 108 can be assigned the same object ID 116 (by digital object manager 114) as the previously-processed object 108 if digital object manager 114 makes a determination that the pair are sufficiently similar using the attributes 402 and 404.

In example 400 shown in FIG. 4, digital object manager 114 can receive, as input, attributes 402 and 404, each of which corresponds to an object detected by object detector 106. Attributes 402 and 404 correspond to a pair of detected objects 108 being analyzed to determine whether they are the same object. Attributes 402 and 404 can be used by digital object manager 114 to determine a measure of similarity (e.g., aggregate similarity measurement 422) between the pair of detected objects 108. The measure of similarity can then be used to determine whether the pair of detected objects 108 are sufficiently similar to be said to be the same object—e.g., to be assigned the same object ID 116.

In accordance with one or more embodiments, each of attributes 402 and 404 (like attributes 112) comprise (for a respective detected object 108) a bounding box and corresponding coordinates, object segment attribute set 206 and affine attribute set 210. The bounding box and corresponding coordinates from each of attributes 402 and 404 can be used by position similarity determination module 406 to determine position similarity measurement 416, the object segment attribute set 206 from each of attributes 402 and 404 can be used by segment similarity determination module 408 to determine segment similarity measurement 418, and the affine attribute set 210 from each of attributes 402 and 44 can be used by affine similarity determination module 410 to determine affine similarity measurement 420.

In accordance with one or more embodiments, position similarity measurement 416, segment similarity measurement 418 and affine similarity measurement 420 can be aggregated to yield aggregate similarity measurement 422, which can be used by object similarity determination module 426 to determine whether or not the pair of detected objects 108 are sufficiently similar to be assigned the same object ID 116.

By way of a non-limiting example, aggregate similarity measurement 422 can be an average of the position similarity measurement 416, segment similarity measurement 418 and affine similarity measurement 420. By way of another non-limiting example, aggregate similarity measurement 422 can be a weighted average, where one (or more) of position similarity measurement 416, segment similarity measurement 418 and affine similarity measurement 420 can be weighted more than the other(s). By way of another non-limiting example, the aggregate similarity measurement 422 can be a total, percentage, etc. determined using a weighted or unweighted scheme. Any technique now known or later developed to combine position similarity measurement 416, segment similarity measurement 418 and affine similarity measurement 420 can be used with embodiments of the present disclosure.

In accordance with one or more embodiments, aggregate similarity measurement 422 can be compared (by object similarity determination module 426) to similarity threshold 424 to determine whether or not the pair of detected objects 108 are sufficiently similar such that the pair of detected objects 108 can be said to be (or depict) the same object, and can be assigned the same object ID.

By way of some non-limiting example, the similarity threshold 424 can indicate an acceptable level of similarity, such that an aggregate similarity measurement 422 that is less than the similarity threshold 424 indicates that the pair of detected objects 108 are different. To further illustrate, an aggregate similarity measurement 422 that is equal to or greater than the similarity threshold 424 indicates that the pair of detected objects 108 are the same object.

In a case that the pair of detected objects 108 are determined (by object similarity determination module 426 to not be sufficient similar (e.g., aggregate similarity measurement 422 is less than similarity threshold 424), the pair of detected objects 108 can be assigned different object IDs 116. By way of a non-limiting example, the detected object 108 currently being analyzed by digital object identification engine 102 can be assigned a new object ID 116 if it is determined that it is not sufficiently similar to any detected object 108 (e.g., with an assigned object ID 116) previously analyzed by digital object identification engine 102.

In accordance with one or more embodiments, position similarity measurement 416 can comprise information indicating a change in position between the pair of detected objects 108. By way of a non-limiting example, position similarity measurement 416 can be determined using a constant velocity tracker such as a Kalman filter and the bounding box and corresponding coordinates (alone or in combination with the object segment attribute set 206) determined for each detected object 108 in the pair.

In accordance with one or more embodiments, segment similarity measurement 418 can be used to address poor (e.g., low) lighting image capture conditions. Poor lighting conditions can easily result in color distortions in the pixel data corresponding to one or both of the pair of detected objects 108. Segment similarity determination module 408 can use object segment attribute set 206 comprising information such as shape, area, edges, etc. to determine segment similarity measurement 418. Segment similarity determination module 408 need not rely only on the pixel data from the object segment (determined by segment attribute generator 204). In accordance with one or more embodiments, segment similarity measurement 418 can also use pixel data (e.g., from the object segments) corresponding to the pair of object to determine segment similarity measurement 418.

In accordance with one or more embodiments, segment similarity determination module 408 can use information such as shape, area, edges, etc. (alone or in combination with the pixel data) included in the object segment attribute set 206 corresponding to each detected object 108 in the pair currently being analyzed by digital object manager 114 to determine segment similarity measurement 418. By way of a non-limiting example, the segment similarity measurement 418 can comprise information indicating a degree of similarity in the object segment attribute set 206 corresponding to each object in the pair currently being analyzed by digital object manager 114. By way of a further non-limiting example, the information can indicate a degree of similarity in the shapes of the objects.

In accordance with embodiments of the present disclosure, trajectory issues can be addressed, at least in part, using affine attribute set 210. In accordance with at least one such embodiment, affine attribute set 210 can comprise information identifying a number of reference points corresponding to a detected object 108. Each reference point can provide a point of comparison for use by affine similarity determination module 410 in determining affine similarity measurement 420. In accordance with one or more embodiments, measurement 420 can correspond to the number of reference points shared by the pair of objects.

Figure 5:
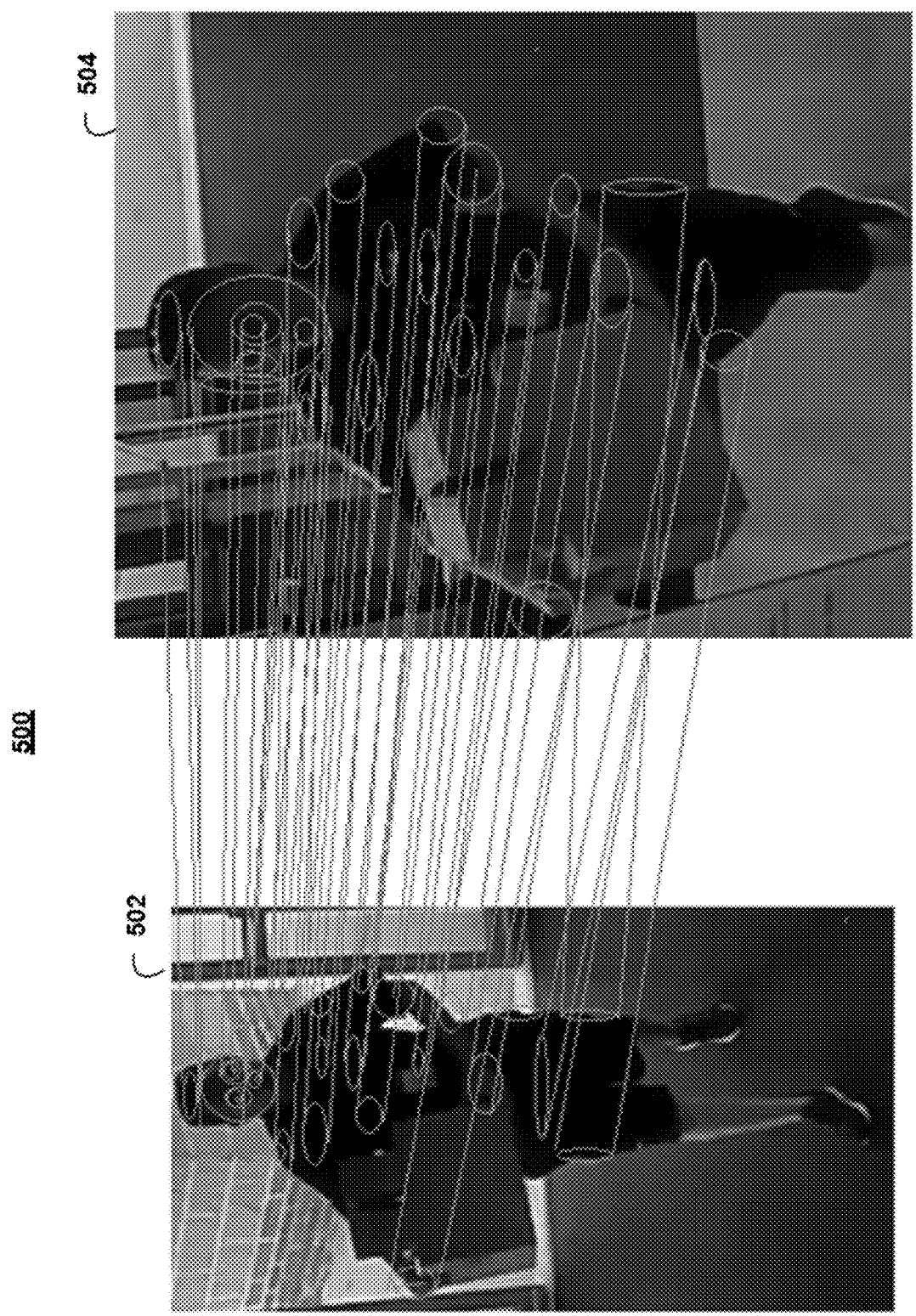
FIG. 5 provides some examples of reference points in accordance with one or more embodiments of the present disclosure.

FIG. 5 provides some examples of reference points in accordance with one or more embodiments of the present disclosure. Example 500 of FIG. 5 includes examples 502 and 504 showing reference points corresponding to a pair of detected objects. In examples 502 and 504, in which the pair of detected objects depict an individual, examples of reference points can include eyes, nose, ear, shoulder, hip, etc. A point of reference can be determined based on the image data and one or more affine transformations. As discussed herein, an affine transformation preserves collinear points and parallel lines, which can be used as reference points. Any point of comparison (e.g., a point of comparison determined using one or more affine transformations) can be used as a reference point in connection with disclosed embodiments.

Referring again to FIG. 4, in accordance with one or more embodiments, aggregate similarity measurement 422 can be determined by object similarity determination module 426 using position similarity measurement 416, segment similarity measurement 418 and affine similarity measurement 420. Aggregate similarity measurement 422 can be used by object similarity determination module 426 along with similarity threshold 424 to determine whether or not the pair of detected objects 108 are sufficiently similar to be considered to be the same object.

Object similarity determination module 426 can assign object ID 116 to a detected object 108 in accordance with the determination. In a case that the pair of detected objects 108 are determined (by object similarity determination module 426) to not be sufficient similar, the pair of detected objects 108 can be assigned different object IDs 116, indicating that the pair of detected objects are different objects.

In accordance with one or more embodiments, a similarity determination can be made to determine whether an object detected in a first frame and an object detected in a next frame are the same object. Object similarity determination, in accordance with embodiments of the present disclosure, can be iteratively performed to identify and track an object through multiple frames of digital content.

By way of some non-limiting examples, digital object identification engine 102 can be used to track objects (e.g., individuals) in connection with a video surveillance application. Additionally, object identification and tracking provided in accordance with embodiments of the present disclosure can be used with video capturing applications to identify and track objects (e.g., players on a field, objects being manufactured, vehicles, such as cars, bicycles, or the like in a race, runners on a track, etc.) across frames of the captured video content.

Figure 6:
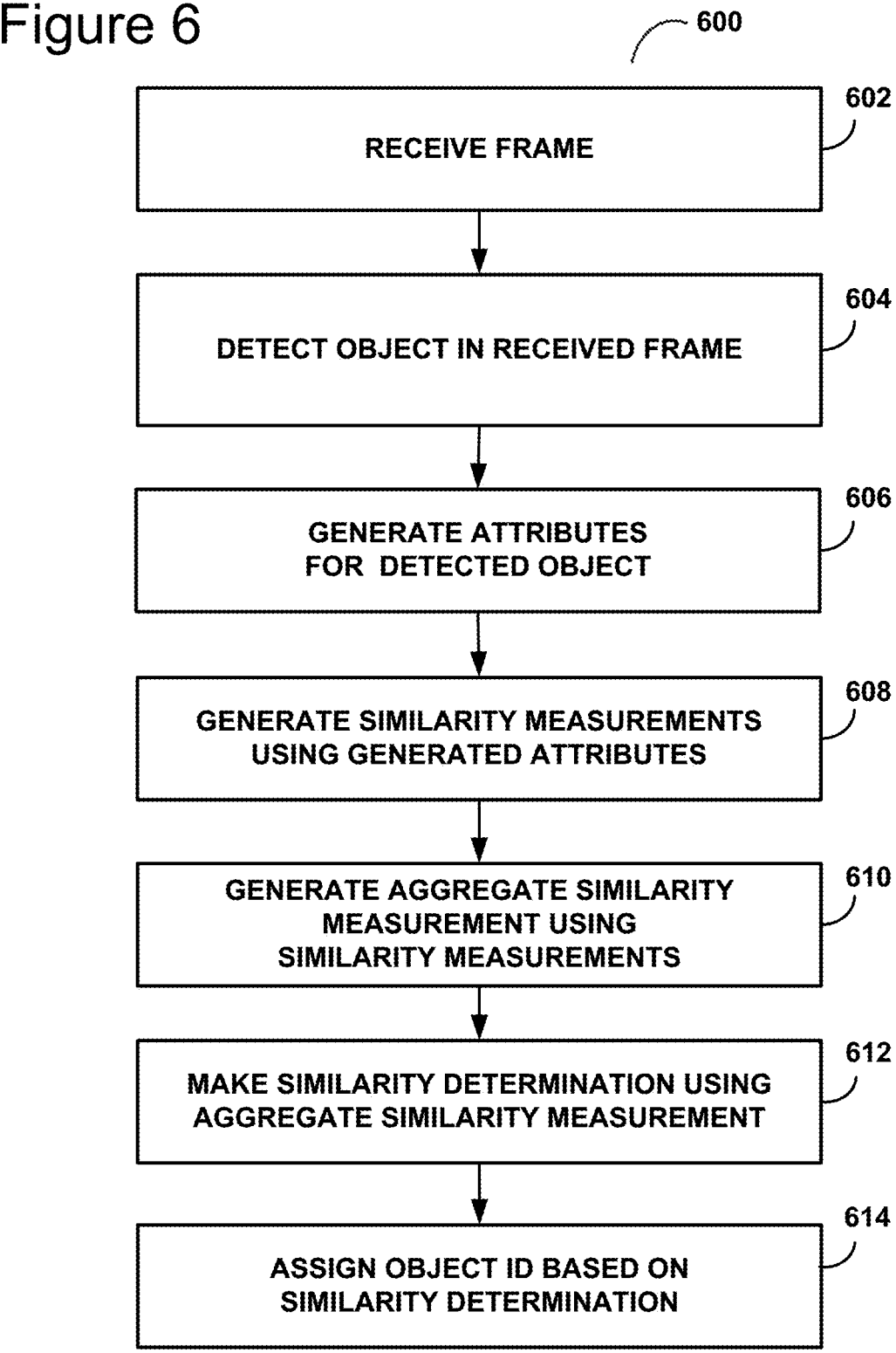
FIG. 6 provides an example of a digital object identification and tracking process flow used in accordance with one or more embodiments of the present disclosure.

FIG. 6 provides an example of a digital object identification and tracking process flow used in accordance with one or more embodiments of the present disclosure. The digital object identification and tracking process flow 600 can be performed by digital object identification engine 102. As discussed herein, digital object identification engine 102 can analyze a detected object (e.g., detected object 108) to identify and track the detected object in digital content. The analysis and identification performed by digital object identification engine 102 can be used to assign an object ID 116, where the same object ID 116 can be assigned to each detected object 108 determined to be sufficiently similar.

At step 602 of process 600, a frame can be received. By way of a non-limiting example, the received (or otherwise obtained) frame can be frame 104 received by digital object identification engine 102. Frame 104 can be one of a number of frames of digital content. Frame 104 can comprise pixel data depicting one or more objects. At step 604, an object can be detected in the received frame. By way of a non-limiting example, object detector 106 can use the pixel data included in frame 104 to identify detected object 108.

At step 606, attributes can be generated for the detected object. By way of a non-limiting example, attributes 112, 402, 404 can be generated by object attribute generator 110. Attributes 112, 402, 404 can comprise position, segment and affine attributes. By way of a non-limiting example, the position attributes can comprise the bounding box and corresponding coordinates (e.g., "x" and "y" coordinates within frame 104 determined for the detected object 108 by object detector 106). By way of some further non-limiting examples, the segment attributes can be object segment attribute set 206 and the affine attributes can be affine attribute set 210.

At step 608, similarity measurements can be generated using the generated attributes. By way of a non-limiting example, bounding box and corresponding coordinates for each detected object 108 in the pair of detected objects 108 being analyzed by digital object manager 114) can be used by position similarity determination module 406 to generate position similarity measurement 416. By way of some further non-limiting examples, object segment attribute set 206 for each detected object 108 in the pair can be used by segment similarity determination module 408 to generate segment similarity measurement 418, and affine attribute set 210 corresponding to each detected object 108 in the pair can be used to generate affine similarity measurement 420.

At step 610, an aggregate similarity measurement can be generated using the similarity measurements. By way of a non-limiting example, object similarity determination module 426 can generate aggregate similarity measurement 422 using position similarity measurement 416, segment similarity measurement 418 and affine similarity measurement 420.

At step 612, a similarity determination can be made using the aggregate similarity measurement. By way of a non-limiting example, object similarity determination module 426 can compare aggregate similarity measurement 422 with similarity threshold 424. By way of a further non-limiting example, object similarity determination module 426 can determine that the pair of detected objects 108 are sufficiently similar if the aggregate similarity measurement 422 satisfies (e.g., is at least equal to, or greater than or equal to) the similarity threshold 424.

In accordance with one or more embodiments, the similarity determination can be used to determine an object ID (e.g., object ID 116) for a detected object currently being analyzed by digital object identification engine 102. At step 614, an object ID can be assigned based on the similarity determination. By way of a nonlimiting example, digital object manager 114 can assign an object ID 116 to a detected object 108 based on the similarity determination made at step 612. If the similarity determination (made at step 612) indicates that the pair of detected objects 108 are sufficiently similar (e.g., considered to be the same object), the pair can be assigned the same object ID 116. Otherwise, the pair of detected objects 108 can be assigned a different object ID 116.

Figure 7:
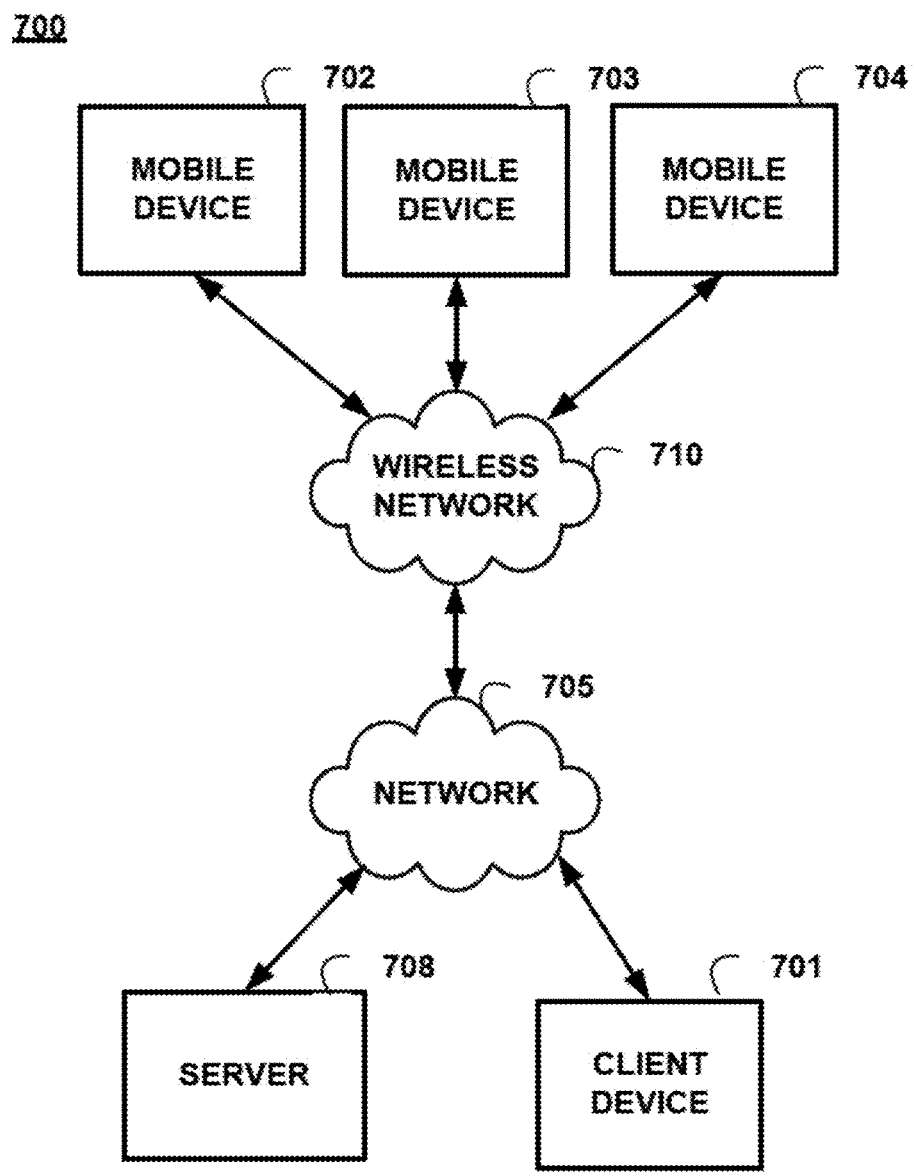
FIG. 7 is a schematic diagram illustrating an example of a network within which the systems and methods disclosed herein could be implemented according to some embodiments of the present disclosure.

FIG. 7 shows components of a general environment in which the systems and methods discussed herein may be practiced. Not all the components may be required to practice the disclosure, and variations in the arrangement and type of the components may be made without departing from the spirit or scope of the disclosure. As shown, system 700 of FIG. 7 includes local area networks ("LANs")/wide area networks ("WANs")—network 705, wireless network 710, mobile devices (client devices) 702-704 and client device 701. FIG. 7 additionally includes a server 708. Examples of web servers include without limitation, application servers, content servers, search servers, advertising servers, etc.

Server 708 can host one or more web applications. In accordance with one or more embodiments, server 708 can include functionality disclosed herein in connection with one or more embodiments.

One embodiment of mobile devices 702-704 is described in more detail below. Generally, however, mobile devices 702-704 may include virtually any portable computing device capable of receiving and sending a message over a network, such as network 705, wireless network 710, or the like. Mobile devices 702-704 may also be described generally as client devices that are configured to be portable. Thus, mobile devices 702-704 may include virtually any portable computing device capable of connecting to another computing device and receiving information. Such devices include multi-touch and portable devices such as, cellular telephones, smart phones, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 702-704 also may include at least one client application that is configured to receive content from another computing device. The client application may include a capability to provide and receive textual content, graphical content, audio content, and the like. In one embodiment, mobile devices 702-704 may uniquely identify themselves through any of a variety of mechanisms, including a phone number, Mobile Identification Number (MIN), an electronic serial number (ESN), or other mobile device identifier.

In some embodiments, mobile devices 702-704 may also communicate with non-mobile client devices, such as client device 701, or the like. Client device 701 may include virtually any computing device capable of communicating over a network to send and receive information. Thus, client device 701 may also have differing capabilities for displaying navigable views of information.

Client device 701 and mobile devices 701-704 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 710 is configured to couple mobile devices 702-704 and its components with network 705. Wireless network 710 may include any of a variety of wireless sub-networks that may further overlay stand-alone ad-hoc networks, and the like, to provide an infrastructure-oriented connection for mobile devices 702-704. Such sub-networks may include mesh networks, Wireless LAN (WLAN) networks, cellular networks, and the like.

Network 705 is configured to communicatively couple web server 708 with other computing devices, including, client device 701, and through wireless network 710 to mobile devices 702-704. Network 705 is enabled to employ any form of computer readable media for communicating information from one electronic device to another. Also, network 705 can include the Internet in addition to local area networks (LANs), wide area networks (WANs), direct connections, such as through a universal serial bus (USB) port, other forms of computer-readable media, or any combination thereof.

Within the communications networks utilized or understood to be applicable to the present disclosure, such networks will employ various protocols that are used for communication over the network. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs.

A server, such as server 708, may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers, such as web server 708 as well as other servers, such as and without limitation authentication servers, search servers, email servers, social networking services servers, SMS servers, IM servers, MMS servers, exchange servers, photo-sharing services servers, and travel services servers, via the network 705 using their various devices 701-704. In some embodiments, application server can host applications, such as an e-commerce application, a search engine, a content recommendation and/or distribution application, etc.

In some embodiments, web server 708 can store various types of applications and application related information including application data. As is discussed in more detail below, examples of application data include user behavior, application behavior, page visitation sequences, and visit intent and action data. In accordance with some embodiments, web server 708 can host an application, or applications, embodying functionality described herein.

Moreover, although FIG. 7 illustrates web server 708 as single computing devices, respectively, the disclosure is not so limited. For example, one or more functions of web server 708 may be distributed across one or more distinct computing devices. Moreover, in one embodiment, web server 708 may be integrated into a single computing device, without departing from the scope of the present disclosure.

Figure 8:
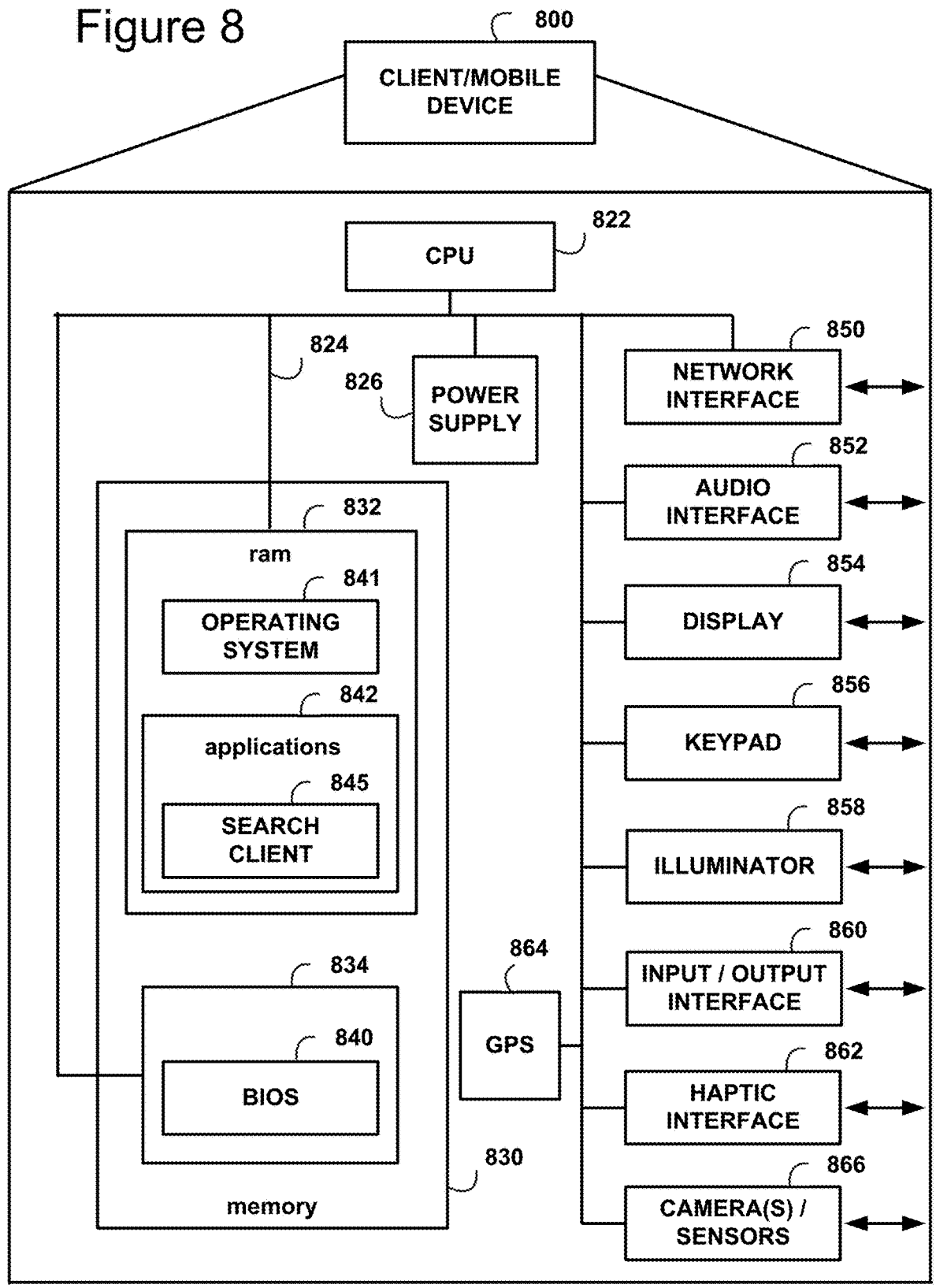
FIG. 8 is a schematic diagram illustrating an example of client device in accordance with some embodiments of the present disclosure.

FIG. 8 is a schematic diagram illustrating an example embodiment of a computing device that may be used within the present disclosure. Device 800 may include many more or less components than those shown in FIG. 8. However, the components shown are sufficient to disclose an illustrative embodiment for implementing the present disclosure. Device 800 may represent, for example, client device 701 and mobile devices 701-704 discussed above in relation to FIG. 7.

As shown in the figure, device 800 includes a processing unit (CPU) 822 in communication with a mass memory 830 via a bus 824. Device 800 also includes a power supply 826, one or more network interfaces 850, an audio interface 852, a display 854, a keypad 856, an illuminator 858, an input/output interface 860, a haptic interface 862, an optional global positioning systems (GPS) transceiver 864 and a camera(s) or other optical, thermal or electromagnetic sensors 866. Device 800 can include one camera/sensor 866, or a plurality of cameras/sensors 866, as understood by those of skill in the art. The positioning of the camera(s)/sensor(s) 866 on device 800 can change per device 800 model, per device 800 capabilities, and the like, or some combination thereof.

Optional GPS transceiver 864 can determine the physical coordinates of device 800 on the surface of the Earth, which typically outputs a location as latitude and longitude values. GPS transceiver 864 can also employ other geo-positioning mechanisms, including, but not limited to, triangulation, assisted GPS (AGPS), E-OTD, CI, SAI, ETA, BSS or the like, or may through other components, provide other information that may be employed to determine a physical location of the device, including for example, a MAC address, Internet Protocol (IP) address, or the like.

Mass memory 830 includes a RAM 832, a ROM 834, and other storage means. Mass memory 830 illustrates another example of computer storage media for storage of information such as computer readable instructions, data structures, program modules or other data. Mass memory 830 stores a basic input/output system ("BIOS") 840 for controlling low-level operation of device 800. The mass memory also stores an operating system 841 for controlling the operation of device 800.

Memory 830 further includes one or more data stores, which can be utilized by device 800 to store, among other things, applications 842 and/or other data. For example, data stores may be employed to store information that describes various capabilities of device 800. The information may then be provided to another device based on any of a variety of events, including being sent as part of a header during a communication, sent upon request, or the like.

Applications 842 may include computer executable instructions which, when executed by device 800, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 842 may further include search client 845 that is configured to send, to receive, and/or to otherwise process a search query and/or search result using any known or to be known communication protocols. Although a single search client 845 is illustrated it should be clear that multiple search clients may be employed.

Figure 9:
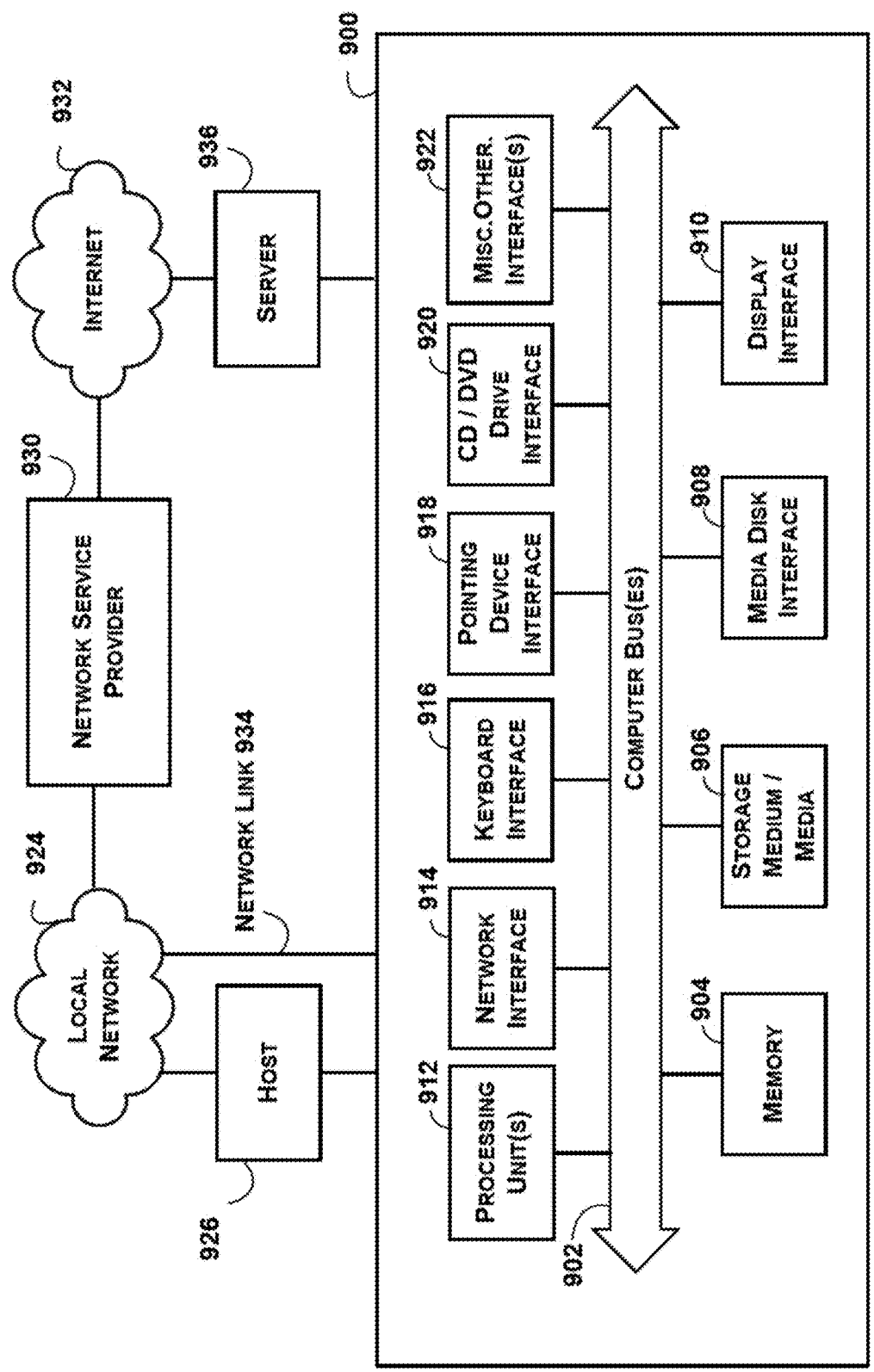
FIG. 9 is a block diagram illustrating the architecture of an exemplary hardware device in accordance with one or more embodiments of the present disclosure.

As shown in FIG. 9, system 900 internal architecture of a computing device(s), computing system, computing platform, user devices, set-top box, smart TV and the like includes one or more processing units, processors, or processing cores, (also referred to herein as CPUs) 912, which interface with at least one computer bus 902. Also interfacing with computer bus 902 are computer-readable medium, or media, 906, media disk interface 908, network interface 914, memory 904, e.g., random access memory (RAM), run-time transient memory, read only memory (ROM), media disk drive interface 920 as an interface for a drive that can read and/or write to media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 934 typically provides information communication using transmission media through one or more networks to other devices that use or process the information. For example, network link 934 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server 936 connected to the Internet 932 hosts a process that provides a service in response to information received over the Internet 932. For example, server 936 can host a process that provides information representing video data for presentation at a display via display interface 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as a storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 912 as it is received, or may be stored in memory 904 or in a storage device or other non-volatile storage for later execution, or both.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
   obtaining, by a computing device, a frame of digital content, the frame comprising pixel data;
   detecting, by the computing device, an object using the pixel data;
   determining, by the computing device, a set of attributes for the detected object, the set of attributes comprising position attributes, object segment attributes and affine attributes;
   determining, by the computing device, a position similarity measurement based on the position attributes;
   determining, by the computing device, a segment similarity measurement based on the object segment attributes; determining, by the computing device, an affine similarity measurement based on the affine attributes;
   determining, by the computing device, a similarity measurement for the detected object, and a second object having a set of attributes, using the set of attributes corresponding to the detected object and the second object's set of attributes, the similarity measurement being an aggregate of the determined position similarity measurement, the determined segment similarity measurement and the determined affine similarity measurement; and
   using, by the computing device, the similarity measurement to make a similarity determination whether or not the detected object and the second object are a same object.

2. The method of claim 1, further comprising:
   assigning, by the computing device, an object identifier (ID) to the detected object in accordance with the similarity determination.

3. The method of claim 2, wherein the similarity determination indicates that the detected object and the second object depict the same object and they are assigned the same object ID, or the similarity determination indicates that the detected object and the second object depict different objects and they are assigned different object IDs.

4. The method of claim 1, using the similarity measurement to make a similarity determination further comprising:
   determining, by the computing device, whether the similarity measurement satisfies a similarity threshold.

5. The method of claim 1, wherein the aggregate is one of: an average, a weighted average, a total or a weighted total.

6. The method of claim 1, further comprising:
   using, by the computing device, the detected object's position attributes and the second object's position attributes to determine the position similarity measurement.

7. The method of claim 6, wherein the position similarity measurement is determined using a constant velocity tracker.

8. The method of claim 7, wherein the constant velocity tracker comprises a Kalman filter.

9. The method of claim 1, further comprising:
   using, by the computing device, the detected object's affine attributes comprising information indicating reference points corresponding to the detected object and the second object's affine attributes comprising information indicating reference points corresponding to the second object to determine the affine similarity measurement.

10. The method of claim 9, wherein the affine similarity measurement comprises information indicating a number of shared reference points.

11. The method of claim 1, wherein the object segment attributes comprise information for a segment of the frame corresponding to the detected object and the object segment attributes comprises information indicating a shape of the detected object.

12. The method of claim 11, further comprising:
   using, by the computing device, the detected object's object segment attributes comprising information indicating a shape of the detected object and the second object's object segment attributes comprising information indicating a respective shape of the second object to determine the segment similarity measurement.

13. The method of claim 12, wherein the segment similarity measurement comprises information indicating a degree of similarity in the shapes of the detected object and the second object.

14. A non-transitory computer-readable storage medium tangibly encoded with computer-executable instructions that when executed by a processor associated with a computing device perform a method comprising:
   obtaining a frame of digital content, the frame comprising pixel data;
   detecting an object using the pixel data;
   determining a set of attributes for the detected object, the set of attributes comprising position attributes, object segment attributes and affine attributes;
   determining a position similarity measurement based on the position attributes;
   determining a segment similarity measurement based on the object segment attributes;
   determining an affine similarity measurement based on the affine attributes;
   determining a similarity measurement for the detected object, and a second object having a set of attributes, using the set of attributes corresponding to the detected object and the second object's set of attributes, the similarity measurement being an aggregate of the determined position similarity measurement, the determined segment similarity measurement and the determined affine similarity measurement; and using the similarity measurement to make a similarity determination whether or not the detected object and the second object are a same object.

15. The non-transitory computer-readable storage medium of claim 14, further comprising:
   assigning an object identifier (ID) to the detected object in accordance with the similarity determination.

16. The non-transitory computer-readable storage medium of claim 15, wherein the similarity determination indicates that the detected object and the second object are the same object and they are assigned the same object ID, or the similarity determination indicates that the detected object and the second object are different objects and they are assigned different object IDs.

17. The non-transitory computer-readable storage medium of claim 14, using the similarity measurement to make a similarity determination further comprising:
  determining whether the similarity measurement satisfies a similarity threshold.

18. A computing device comprising:
  a processor; and
  a memory comprising instructions that, when executed by the processor, perform the steps of:
    obtaining a frame of digital content, the frame comprising pixel data;
    detecting an object using the pixel data;
    determining a set of attributes for the detected object, the set of attributes comprising position attributes, object segment attributes and affine attributes;
    determining a position similarity measurement based on the position attributes;
    determining a segment similarity measurement based on the object segment attributes;
    determining an affine similarity measurement based on the affine attributes; determine a similarity measurement for the detected object, and a second object having a set of attributes, using the set of attributes corresponding to the detected object and the second object's set of attributes, the similarity measurement being an aggregate of the determined position similarity measurement, the determined segment similarity measurement and the determined affine similarity measurement; and
    using the similarity measurement to make a similarity determination whether or not the detected object and the second object are a same object.

\* \* \* \* \*